Inventor
Benjamin W. Freeman

Jan. 17, 1933.　　　B. W. FREEMAN　　　1,894,486
CUT-OUT MACHINE
Filed Feb. 12, 1931　　　6 Sheets-Sheet 2

Inventor
Benjamin W. Freeman,
By Riordan & Riordan
Attorney

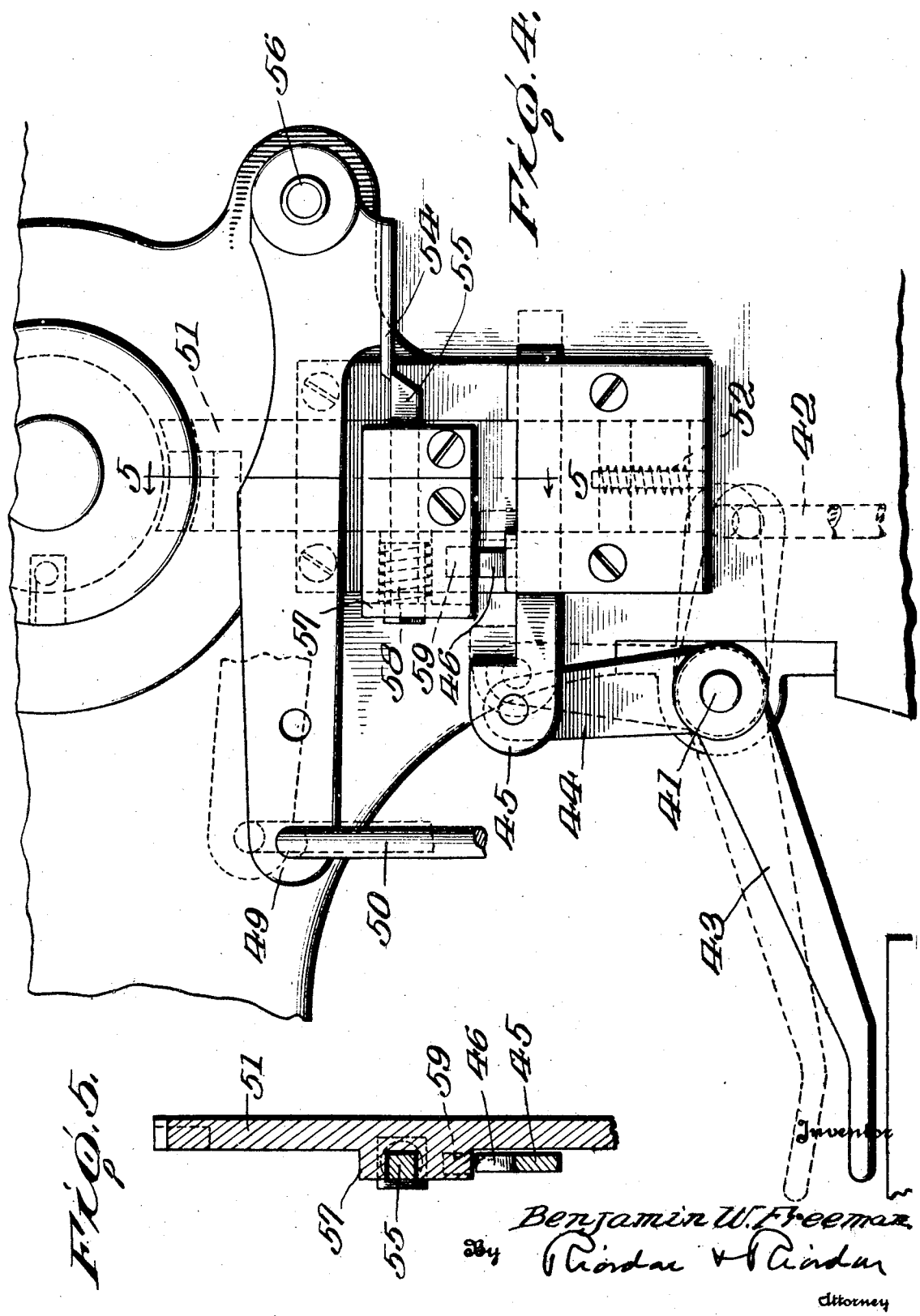

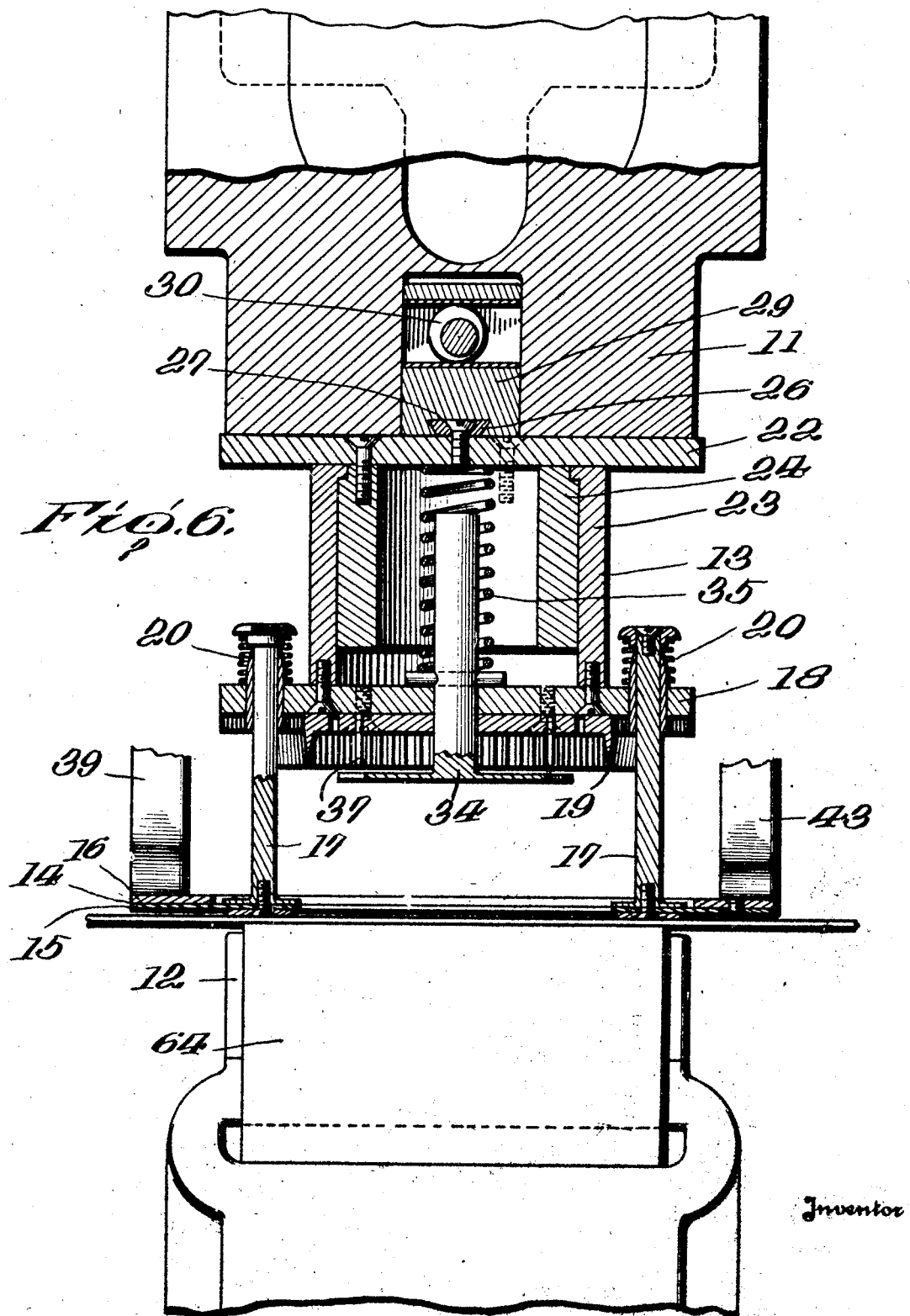

Jan. 17, 1933.  B. W. FREEMAN  1,894,486
CUT-OUT MACHINE
Filed Feb. 12, 1931  6 Sheets-Sheet 6
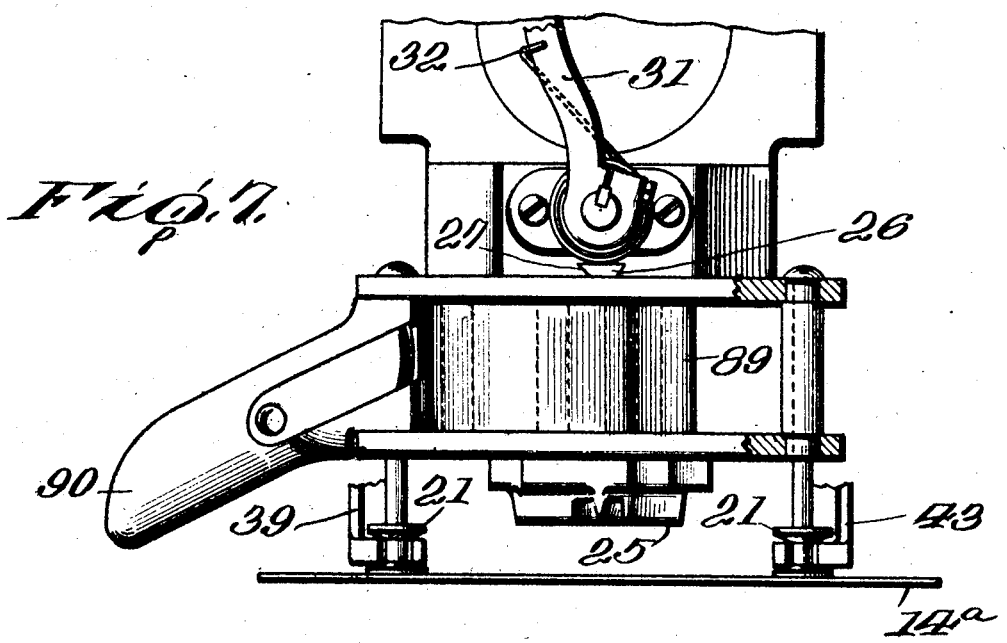
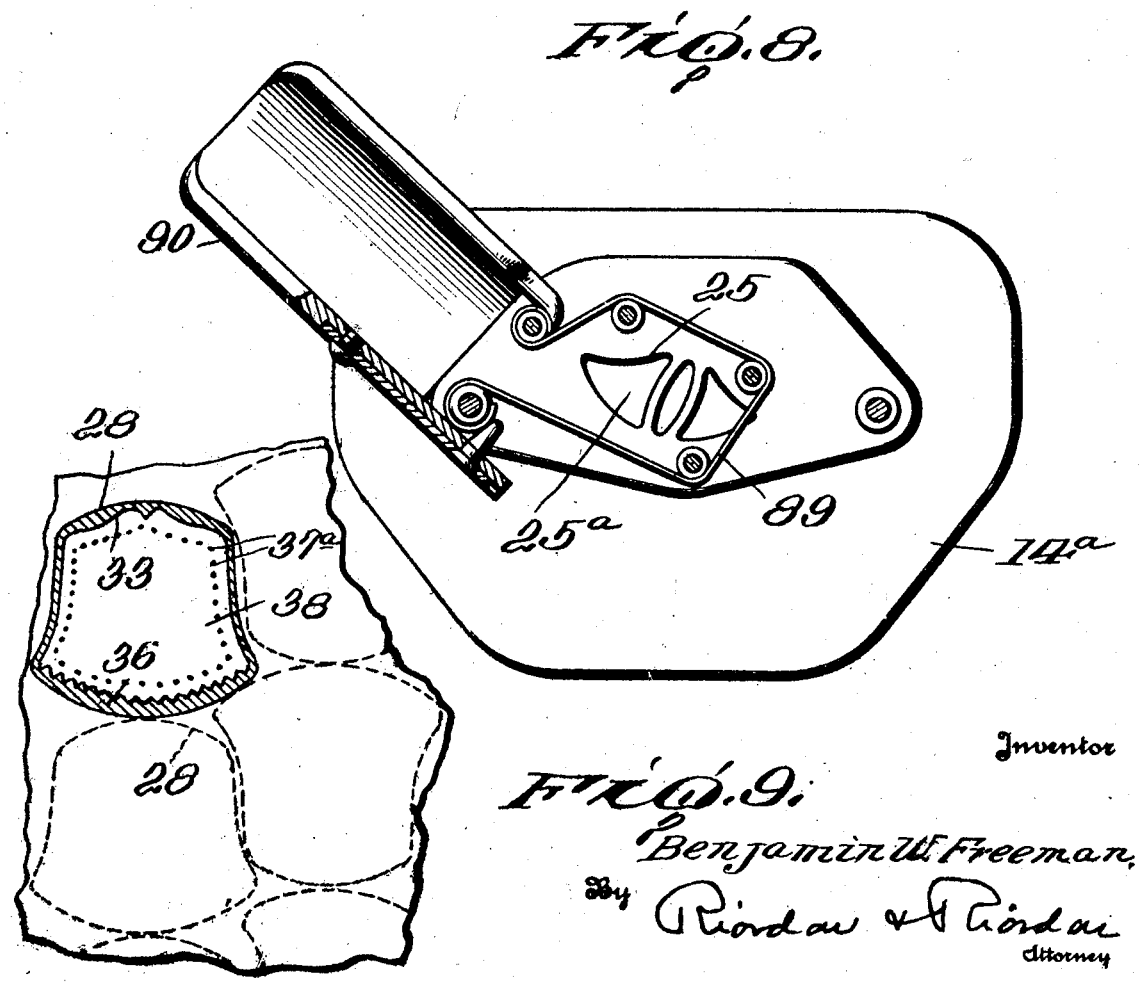
Inventor
Benjamin W. Freeman,
By Riordan & Riordan
Attorney Patented Jan. 17, 1933

1,894,486

UNITED STATES PATENT OFFICE

BENJAMIN W. FREEMAN, OF CINCINNATI, OHIO

CUT-OUT MACHINE

Application filed February 12, 1931. Serial No. 515,346.

This invention relates to shoe machinery and more particularly to cutout machines adapted for operation upon skins, upper blanks, fitted or closed uppers and the like.

As an illustration of the type of machine contemplated by this invention, reference may be made to my prior Patent No. 1,681,033, dated August 14th, 1928, the present invention representing an improvement thereover.

In cutting blanks from a skin it has been customary heretofore, to first block out the blank from the skin by hand cutting or by using a die on a "clicking machine", the work being placed upon a wood block designed to act as a backing for the cutter, and then subsequently to trim the blank to final size and shape by using a flat bed die. The work has been handled in this manner, because in the past there has been no machine or die, or combination thereof which would give a satisfactory clean cut, direct from a skin. The trade has gone so far as to place paper over the wood block, in an attempt to get clean cut work, but this has not been successful, as a clicking machine is not so constructed as to prevent the die from oftentime coming through the paper, sinking into the wood and giving a ragged edge to the work.

One of the objects then of the present invention is to provide a machine and type of die and combination thereof by means of which the finished blank can be cut direct from the skin, without the previous blocking out.

The blanks as cut on a clicking machine heretofore, required trimming on a flat bed die, after the blocking out on a clicking machine to insure a good, clean edge and the trimmed-off scrap material involved considerable waste. Accordingly this invention aims to avoid such waste or scrap by obtaining the exact blank, and a good clean cut in a single operation.

Another object resides in the provision of a die structure which may be swung from one position to another when operating upon a skin, thus to avoid the necessity of swinging the skin itself.

A still further object is to provide a machine which may utilize a variety of different dies, whereby the machine with a proper die, may operate directly upon a skin or may be used to form ornamental cutouts in a blank which has been previously cut from the skin, or which may be utilized to ink mark the work either independently of, or conjointly with a cutting-out operation.

One feature of the machine resides in a structure whereby the various dies may be interchangeably used and readily detached or attached in position.

Various safety mechanisms designed to prevent injury to an operator or to the work by preventing premature movements of the cutting die, form an important improvement in this machine.

To the attainment of the above and other objects of the invention which will appear as the description proceeds, reference may be had to the accompanying drawings illustrating preferred embodiments of the invention, in which:—

Fig. 4 is an enlarged detail of the clutch locking mechanism;

Fig. 5 is a detail in section taken on line 5—5 of Fig. 4;

Fig. 6 is an enlarged detail, partly in section, showing specifically the die illustrated in Fig. 1;

Fig. 7 is an elevation of one form of die structure adapted for use in the machine;

Fig. 8 is a plan view partly in section of the die illustrated in Fig. 7; and

Fig. 9 is a plan view of a skin illustrating a method of blocking out blanks.

Figure 1:
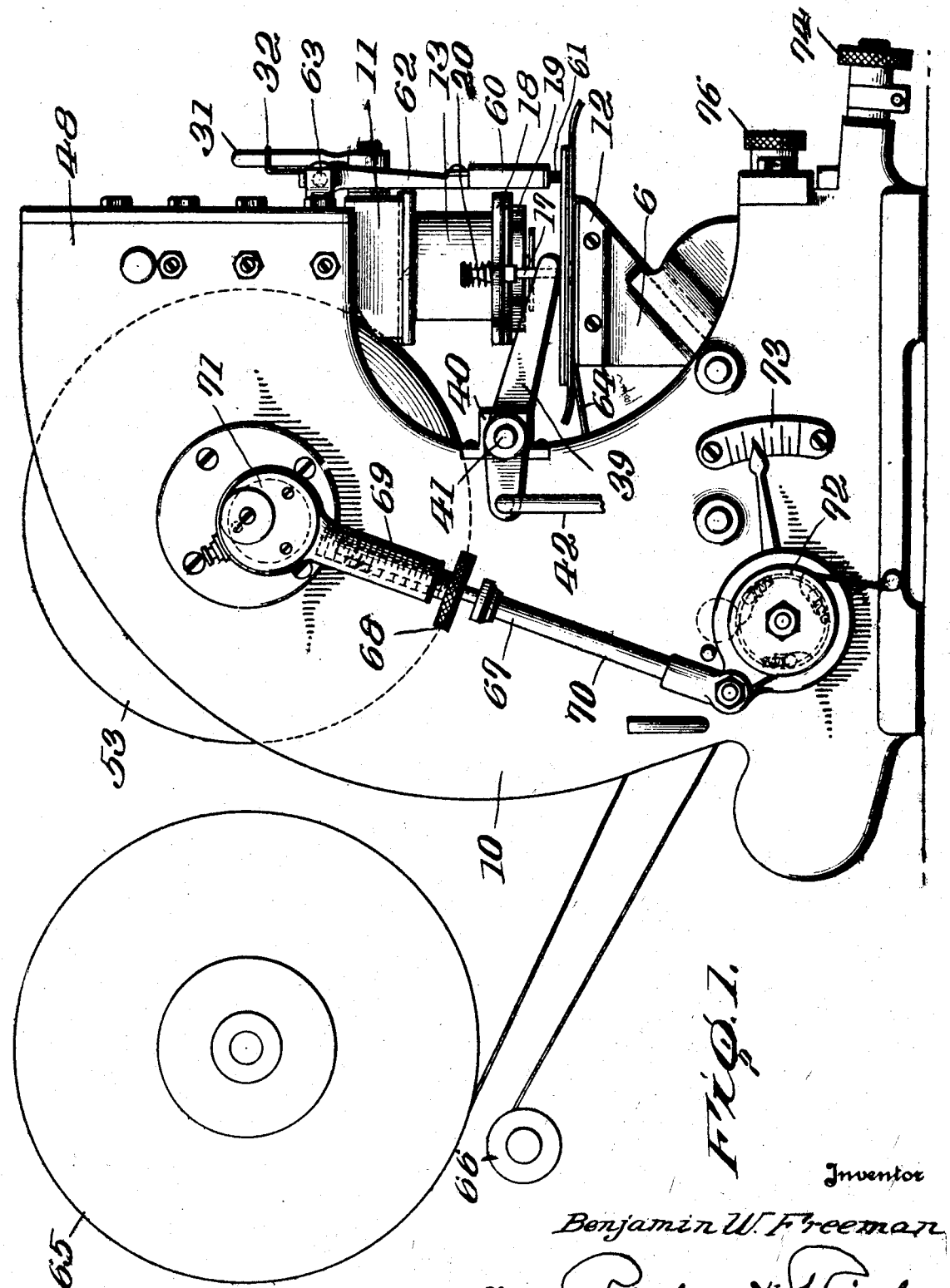
Fig. 1 is a side elevation of the machine.

The present machine is adapted to use a die for cutting directly from a skin, or a die for ornamenting, cutting out, or perforating an upper blank which has been previously cut from the skin, regardless of whether such blank is flat or shaped into a closed upper. It comprises generally a power driven plunger cooperating with the die (in the illustrated embodiments the die is mounted on the plunger for movement therewith, although the die might readily be located in fixed position below the work) and an anvil or work support over which the skin or upper is draped, there being a backing member of paper or its equivalent arranged for placement between the work and the support. In order to properly align, gauge and position the work, a gauging mask movable into position relative to the work, is provided.

Referring more specifically to the drawings in which like reference numerals designate like parts it will be observed that in Figs. 1, 2, 4, 5 and 6, the machine contemplates use of a die for cutting directly from the skin, shown in Fig. 9. This machine is provided with a frame 10 enclosing suitable mechanism for reciprocating a plunger 11 relative to an anvil or horn-like work support 12. A die organization indicated generally at 13 is secured to the plunger and carries a mask 14 which as illustrated, is formed of celluloid or other transparent material 15, so that the work can be readily observed under the mask, and reinforced by an annular metal member 16. One form of mask and die arrangement utilizing the transparent idea is illustrated in my co-pending application Serial No. 235,099, filed November 22nd, 1927. This mask is attached to the die by a pair of studs 17 which slide freely through a die supporting plate 18, the cutting edges 19 of the die being detachably secured to the plate.

Springs 20 surround the studs 17 and by engagement with the heads of the studs normally tend to draw the mask to a position adjacent the cutting edges. The celluloid portion of the mask is cut out to conform generally to the configuration of the cutting edges of the die and the inner edge of this cutout portion functions as a gauge or means of aligning the work with said cutting edges. The cutting edges, pass through this cutout portion to engage the work.

It is desirable to be able to swing the die about its pivot, as it is not always practical to move a large skin around sufficiently so that the die will come down and cutout in the most economical fashion.

To this end, the plate 18 is bolted to an outer sleeve 23 which is rotatably mounted on an inner sleeve 24, the sleeve 24 being fixedly attached to the plate 22. Thus the cutting edges of the die as well as the mask may be freely rotated or swiveled to any desired position, while in the head or plunger of the machine, the plate 22 is preferably fixedly attached to the plunger head 11.

By means of this arrangement a direct cutting of the finished blank from the skin is possible. Heretofore, with certain types of work, such as the various pieces of leather that are attached to the outside of shoes for ornamentation and the like i. e., appliqués, tongues, foxings, saddles, etc., it has been necessary to block out the work by outlining the same as indicated in Fig. 9 at 28, and cutting same out usually by hand mallet die, on a clicking machine or by hand. The final blank 38 is usually then cut on a flat bed die along a line indicated at 33 from the blocked out piece, leaving a scrap piece as shown in shaded lines at 36. With the present device, which will make a clean cut the blocking is avoided, thus enabling a closer spacing of the finished blanks in the skin and avoiding the waste of material, to say nothing of the omission of at least one operation previously required by the "blocking out", with attendant saving in time and increase in production.

A dove-tail key 26 is provided on the plate 22 and mates with a dove-tail groove 27 in a portion of the plunger head 11, and provides means for detachably inserting the entire die organization on the plunger head.

It is important that all looseness or play in the die during its reciprocation by the plunger be avoided, and that the die be held together against the plunger head.

To this end, a novel gripping mechanism is employed, which comprises a block 29, carried by the plunger 11, which block is moved up and down by means of a cam 30 which is actuatable by a lever 31 from the front of the machine. The dove-tail groove 27 is formed in the lower plunger of the block 29. To insert the die the lever 31 is moved to the left, lowering the block and when the die has been completely inserted in the dove-tail groove, the lever is released, whereupon a spring 32 moves the lever to the right raising the block and clamping the die tightly against the plunger head 11.

By means of the center guide (the dove-tail arrangement) various shaped dies of any width, or depth can be used without the guide or holding means interfering in any way.

Located centrally of the organization is a spring pressed plunger 34 held normally in advance of the cutting edges 19 by a spring 35. On a downward movement of the plunger head 11 and die 13 the member 34 engages the work and clamps it firmly in position until the cutter 19 has finished its cutting out operation. Still under the influence of the spring 35 the member 34 then acts as a stripper for the edge 19.

It will be noted that the edges 19 are spaced from the outer edge of the member 34. Between these edges is a row of perforating tubes 37, the points of which are in the same plane as the cutting edges 19 and the blank which is cutout is perforated simultaneously with the cutting out operation by such tubes, thereby leaving a series of ornamenting perforations 37a (Fig. 9). It will be obvious that by substituting pins for tubes, indentations may be produced instead of perforations, which indentations may serve later as a guide for stitching or for laps or the like.

In the normal operation of the device a skin is placed over an anvil or support and the mask brought into engagement therewith functioning as a holddown, but primarily as a means of permitting that portion of the skin to be cut to be aligned with the cutting edges 19.

The operation of the mask and associated mechanism will now be described.

Mounted on the machine by means of brackets 40, is a rock shaft 41, to one end of which is connected a treadle link 42 leading to any suitable treadle (not shown).

A pair of arms 39—43 are keyed to the shaft 41, these arms being positioned to engage the mask 14. It will be obvious that a movement of the rod or lever 42 will cause a corresponding movement of the shaft 41 and the arms 39—43 to depress or raise the mask. Usually the treadle will be pivoted so that a depression thereof causes the arm 42 to raise and force the mask downwardly, although any desired linkage may be utilized.

Upon release of the treadle, the springs 20 will act to return the mask to a normal position adjacent the cutting edges of the die.

A slight variation of the structure just described, contemplates attachment of the die or cutting edges directly to a plate operating up and down by means of the treadle link 42 in a manner similar to the mask, in which event the mask may be set in advance of the die or omitted and alignment of the work accomplished by introduction of the cutting edges to a point in proximity to the work and subsequent actuation of the cutting edges by the plunger to perform the actual cutting out operation.

An arm 44, which may be formed as a crank continuation of the arm 43, or which may be separately keyed to the shaft 41, is operatively connected to a lock member 45 arranged to slide transversely of the machine. The lock 45 is provided with a protuberance 46 for a purpose hereinafter described.

Movement of the plunger head is effected by a power shaft 47 in the head 48 of the machine, the shaft being controlled by a clutch 47a which in turn is controlled by lever 49 and link 50. Clutch key 51 is urged by a spring 52 into position where the clutch is held inoperative. This clutch (details of which form no part of the present invention) connects the shaft 47 to a pulley 53.

Movement of the lever 49 downwardly causes a depression of the key through engagement of keeper 54 with a control key 55. The arm 49, being movable about a pivot 56 will permit the keeper 54 to slide off control 55, thereby releasing the latter. In other words, depression of link 50 permits actuation of 47 through clutch 47a and the key, returning immediately stops such actuation after a single revolution.

A connection between the arm 43 and lock 45 is provided by means of the arm 44. Mounted for movement on the key 51 is a housing 57 for the key 55, a spring 58 being positioned therein for returning said key after it passes the keeper 54. Below this spring is a depression 59 located to mate with the projection 46, this arrangement provides a safety lock for the machine.

As a further measure of safety, a glass guard 61 is located on the front of the machine, a frame 62 in which the glass is mounted being provided for the purpose. This frame is pivoted at 63 so that the guard may be swung from an inoperative position adjacent the head 48 to the position shown in Figs. 1 and 2 where it prevents the hands of the operator from being moved forwardly under the die.

The arms 60 of the frame 62, in which the glass is directly supported, are channeled to receive the ends of the glass and to provide a track therefor. Thus the glass is free to slide up and down in the frame 62 with the movement of the mask.

To provide a backing for the work against which the cutting edges of the die will be directed as they cut through the skin, or upper, a paper strip 64 is provided which extends across the top of the work support 12. This paper is fed from a supply roll 65 across the support 12 and back to a take-up roll 66. The amount of feed of paper is controlled by a feed regulator indicated generally at 67, the details of which form specifically no part of the present invention, other than in the combination shown.

A threaded member having a knurled roll 68 is provided to connect two members 69 and 70, the member 69 having an eccentric 71 connected to the power shaft 47 of the machine, and the member 70 being connected to a clutch 72 which completes the connections to a clutch and tension member 72. An indicator 73 is provided to show at a glance the feed regulation. This paper feed mechanism, together with the supply and take-up rolls are illustrated but diagrammatically, as this feature specifically forms no part of the present invention.

A vernier device 74 located beneath the work support 12 is provided for adjustments of the support to obtain a proper cut for heavy or light leathers by virtue of a wedge 75 controlled by the vernier for movement under the support. Different shaped work tables or supports may be used in the machine, these being readily removed or inserted, and to this end a retaining plate and adjustment therefor is illustrated at 76.

Figure 3:
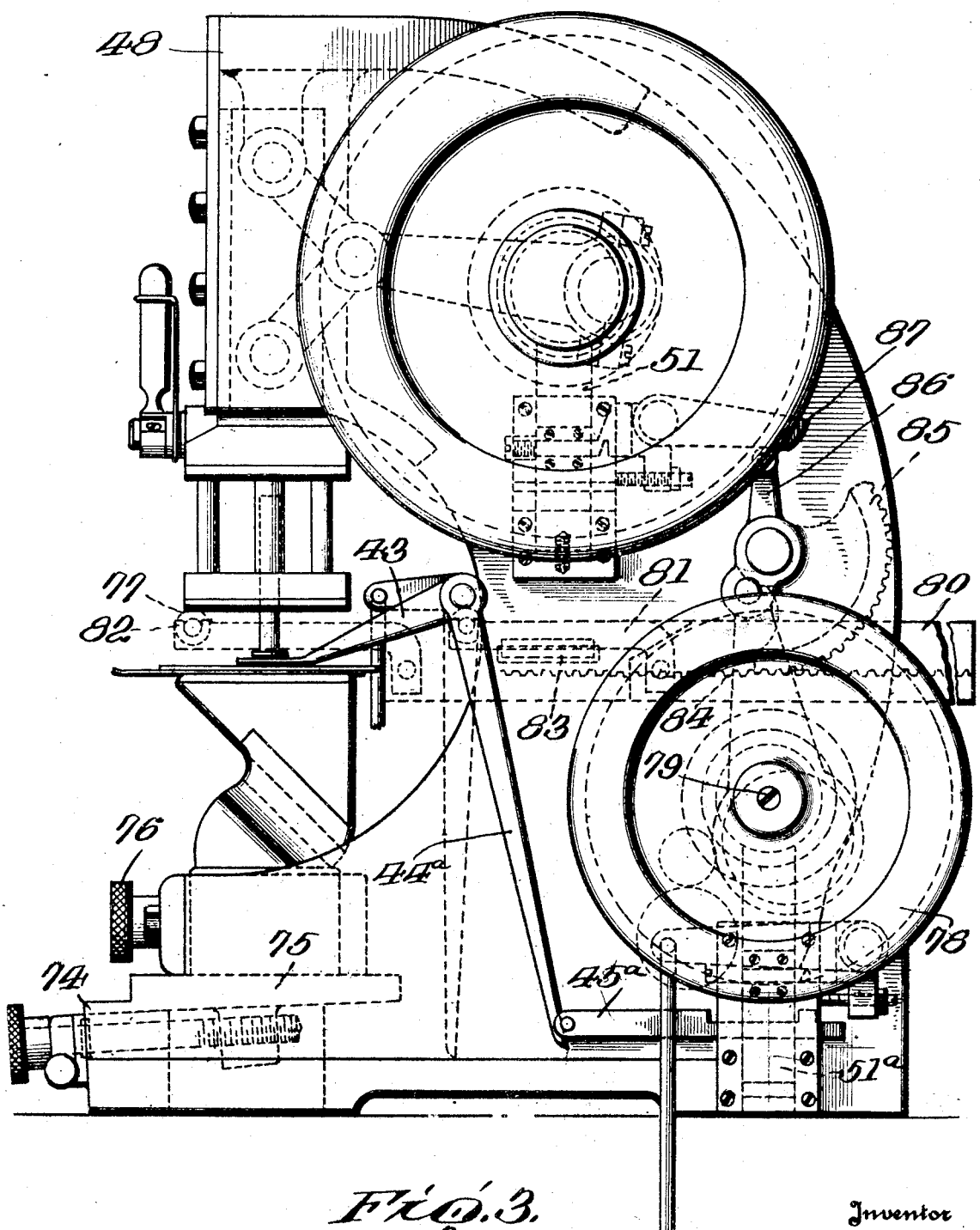
Fig. 3 is a side elevation looking in the opposite direction of Fig. 1, the machine being slightly modified to illustrate the use of a marking die.

In Fig. 3 a slight modification of the treadle arrangements and safety mechanism is disclosed. In this form there is provided a mechanism for ink marking the die member 77 which may be used in conjunction with the usual cutting die, or independently thereof. The arm 43 in this view, instead of being connected to an arm 44 is connected to the arm 44a which engages a lock member 45a. This lock member 45a cooperates with a clutch key 51a in exactly the same manner as the lock and clutch key disclosed in Fig. 4. The single revolution clutch controlled by the key 51a is adapted to connect a suitable source of power such as the pulley 78 to a shaft 79 which actuates, through suitable gearing, a carriage 80, on the forward end of which is mounted an arm 81 supporting an inking roll 82. This roll contacts in one position with an ink pad 83 and in another position with the marking die 77 to transfer ink thereto.

It might be stated that this roll acts as an additional safety device and may be used with or without ink for such purpose. When the roll travels forwardly in the machine to assume its outermost position it will tend to brush or sweep away the fingers or any other obstruction that might be in the path of the cutter, and in fact the device may be shaped particularly to perform this operation rather than an ink marking operation, or in addition thereto.

A rack bar 84 on the carriage engages a gear segment 85 which is connected to an eccentric strap 86. The strap 86 acts to raise or depress a lever 87 which in turn controls the clutch key 51 in the manner heretofore described.

For a more complete description of the ink marking mechanism, reference may be made to my copending application Serial No. 478,264 filed August 27th, 1930.

In Figs. 7 and 8 is disclosed a slightly different form of die from that illustrated in Fig. 6. A mask 14a is positively actuated by the arm 39 and 43, instead of being spring pressed in one direction. This is accomplished through the medium of the collars 21 which are engaged by the arms. This die is furnished with cutting edges 25 for producing ornamental cutouts in an upper blank.

Surrounding the die, an upstanding wall 89 is arranged, this wall having an opening leading to trough 90. It will be clear that as the die descends to operate upon the work, that chips of the same shape as the cutting edges 25 will be cut out and that during repeated operations, the accumulation of chips from the cutouts of the work will be forced upwardly through the openings 25a to the enclosure 89 and thence will work outwardly into the trough 90 and at no time will they tend to clog the machine. The trough 90 with the enclosure 89 is made detachable, and the various dies are arranged to accept this chip trough and enclosure. One trough then may be used with all various types of die being placed on the die after same is inserted in the machine.

Figure 2:
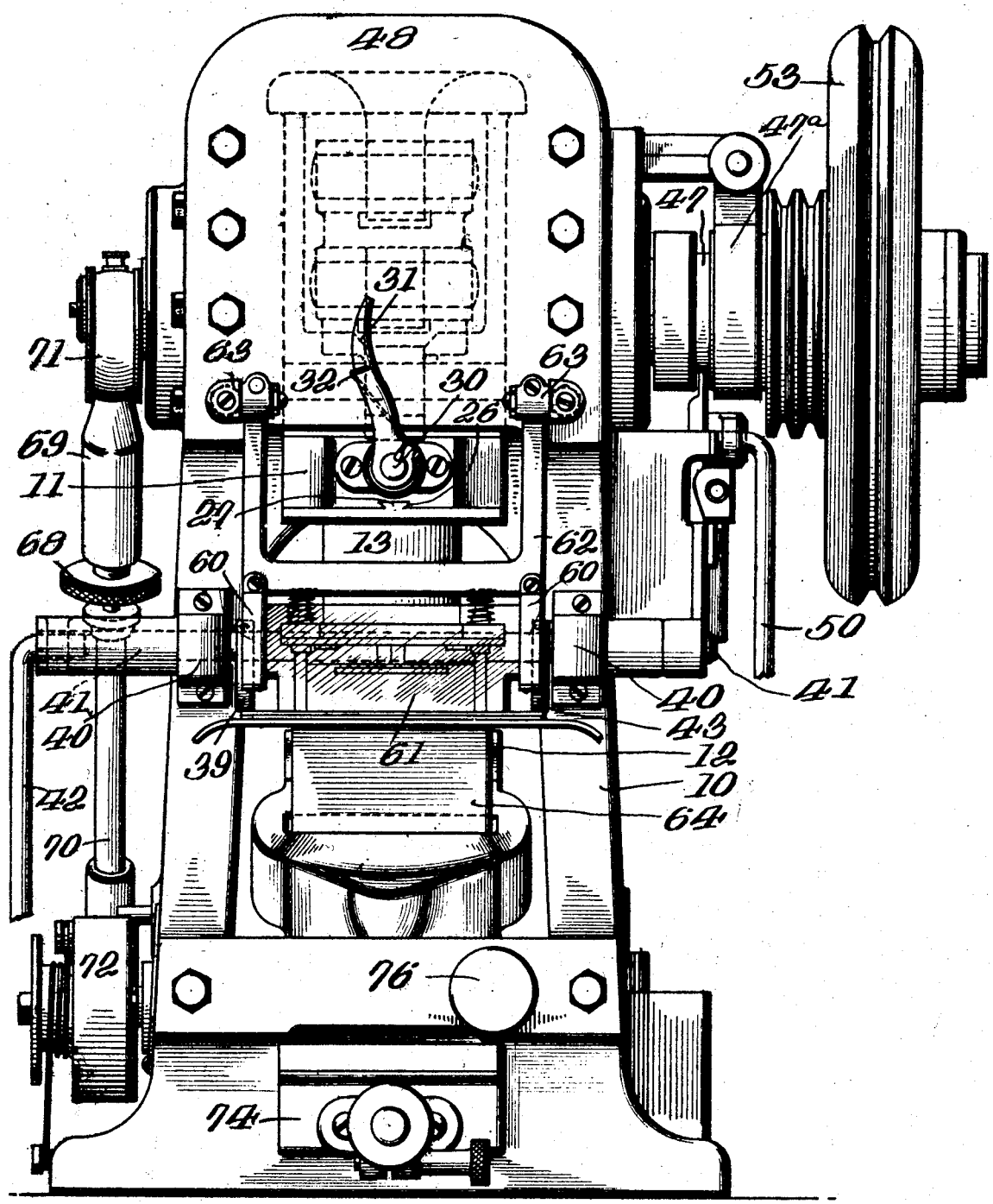
Fig. 2 is a front elevation of the same.

In pointing out the adaptability of this machine, it will be noted that a die for operating on skins is disclosed in Figs. 1, 2 and 6; a marking die, which may be used with a cutting die or independently thereof is disclosed in Fig. 3 while Figs. 7 and 8 show one type of die which is well adapted for working on upper blanks, regardless of whether such blanks are flat or fitted.

The anvil or work supporting horn 12 is of such a shape as to provide free clearance on all sides so that a closed upper may be draped thereover without buckling and at the same time a flat blank may be used just as effectively.

Having thus described my invention, what I claim as new and desire to secure by Letters Patent of the United States, is:—

1. A machine for ornamenting shoe parts, comprising a work support, a die, pressure applying means, a gauge mask, resilient means mounting said mask for movement relative to said die and work support, and means in the machine independent of the die, to move said mask relative to the die and work support, said resilient means being effective to return the mask to its original position.

2. A machine for ornamenting shoe parts, comprising a work support, a die, pressure applying means, and means to mount said die for rotatable movement about its axis, in the machine.

3. A machine for cutting shoe blanks from a skin, comprising a work support, a reciprocable plunger, a die mounted on said plunger for movement therewith, and a swivel connection between said die and said plunger whereby the die may be rotated about its axis to any desired position, relative to the skin.

4. An ornamenting machine comprising a work support, a die, a pressure applying plunger, said die comprising a cylindrical body member, a sleeve encircling said body member and rotatable thereabout, and means for attaching said die to the head of said plunger for movement therewith comprising a cam actuated block slidable in said head and having a dove-tail groove, a dove-tail strip mounted on said die effective to mate with said groove and connect the die to the block, and means to slide said block inwardly of the head thereby to clamp the die rigidly against the head.

5. In a machine for ornamenting shoe parts, a die, a pressure applying plunger and means for attaching said die to the head of said plunger for movement therewith, comprising a block movable in said head and a connection between said block and said die, a handle for said block having an eccentric portion effective to move the block inwardly of the head upon movement of the handle thereby to clamp the die rigidly against the plunger.

6. An ornamenting machine, comprising a die, a pressure applying plunger, and means for attaching said die to the head of said plunger for movement therewith comprising a cam actuated block slidable in said head and having a dove-tail groove, a dove-tail strip mounted on said die effective to mate with said groove, and connect the die to the block, and means to slide said block inwardly of said head, thereby to clamp the die rigidly against the head.

7. A die unit for ornamenting machines comprising a cylindrical body member having means to attach the unit to the machine, a sleeve encircling said body member and rotatable thereabout, a supporting plate attached to said sleeve, cutting edges mounted on said plate, studs mounted in said supporting plate for sliding movement relative to said die and a gauge mask connected to said studs, spring means engaging said studs and effective to normally position said mask adjacent the cutting edges.

8. A die unit for ornamenting machines comprising a cylindrical body member having means to attach the unit to the machine, a sleeve encircling said body member and rotatable thereabout, a supporting plate attached to said sleeve, cutting edges mounted on said plate, studs mounted in said supporting plate for sliding movement relative to said die and a gauge mask connected to said studs, spring means engaging said studs and effective to normally position said mask adjacent the cutting edges, a stripper mounted within the confines of said edges, and resilient means normally positioning said stripper in advance of said edges whereby the stripper is effective to engage a work piece prior to contact therewith of the cutting edges.

9. In an ornamenting machine having operating parts including a die, a gauge mask mounted for movement relative to said die, means in the machine to move said mask away from the die, and a transparent guard mounted in front of the die said guard having a portion movable with said mask.

10. In an ornamenting machine having operating parts including a die, a transparent guard pivotally mounted on said machine and positioned so that it may be swung from an inoperative position away from the die to a protective position in front of the die.

11. In an ornamenting machine having operating parts including a die, a transparent guard pivotally mounted on said machine and positioned so that it may be swung from an inoperative position away from the die to a protective position in front of the die, a mask mounted for movement toward and from the cutting edges of the die, said guard having a portion movable with said mask.

12. A die unit for ornamenting machines comprising a cylindrical body member having means to attach the unit to the machine, a sleeve encircling said body member and rotatable thereabout, a supporting plate attached to said sleeve and rotatable therewith about its axis, and cutting edges mounted on said plate.

13. A die unit for ornamenting machines comprising a cylindrical body member having means to attach the unit to the machine, a sleeve encircling said body member and rotatable thereabout, a supporting plate attached to said sleeve and rotatable therewith about its axis, and cutting edges mounted on said plate, a resiliently mounted stripper within said edges.

14. A die unit for ornamenting machines comprising a cylindrical body member having means to attach the unit to the machine, a sleeve encircling said body member and rotatable thereabout, a supporting plate attached to said sleeve and rotatable therewith about its axis, and cutting edges mounted on said plate, studs mounted in said supporting plate for sliding movement relative to said die and a gauge mask connected to said studs.

15. A die unit for ornamenting machines comprising a body member having means to attach the unit to the machine, a die block mounted in spaced relation to said member cutting edges on said block, a passage for cutout chips leading from said cutting edges through the space between said member and block to the side of said unit and a chip receiving trough mounted to form a continuation of said passage.

16. A die unit for ornamenting machines comprising a body member, a die block mounted in spaced relation to said member and having cutting edges thereon, a passage for cutout chips leading from said cutting edges to the space between said member and said block, an enclosure for the reception of chips located between said member and block and communicating with said passage, and a chip trough detachably mounted on said member unit in communication with said enclosure, to receive chips from said enclosure.

17. A machine for ornamenting shoe parts, comprising a work support removable from the machine, a die, means to adjust said support in the machine, pressure applying means, a transparent gauge mask mounted for movement relative to said work support and said die, and means independent of said work support and die to move said mask.

18. A machine for ornamenting shoe parts comprising a work support, a cutting die, a marking die, means to apply ink to said marking die, pressure applying means effective to produce relative movement between the dies and a piece of work on the work support, a gauge mask, resilient means mounting said mask for movement relative to said die and work support, and means in the machine independent of the die to move said mask relative to the die and work support, said resilient means being effective to return the mask to its original position.

19. A die unit for ornamenting machines comprising a body member having means to attach the unit to the machine, a die block mounted in spaced relation to said member, cutting edges on said block, a passage for cutout chips leading from said cutting edges to the space between said member and block and a chip receiving trough extending transversely of said die and positioned to receive and deflect chips from said space to a point at the side of the cutting edges of the die.

20. A die unit for ornamenting machines, comprising a body member, a die block mounted in spaced relation to said member and having cutting edges thereon, a passage for cutout chips leading from said cutting edges to the space between said member and said block, a chip trough communicating with said passage and extending transversely of said die and positioned to receive and deflect chips from said space to a point at the side of the cutting edges of the die, said chip trough being detachably mounted on said unit.

In testimony whereof I affix my signature.

BENJAMIN W. FREEMAN.